US008844601B2

(12) United States Patent
Krämer et al.

(10) Patent No.: US 8,844,601 B2
(45) Date of Patent: Sep. 30, 2014

(54) VACUUM PAD AND LABELING MACHINE

(75) Inventors: Klaus Krämer, Dortmund (DE); Bert Wenzlawski, Oer-Erkenschwick (DE)

(73) Assignee: KHS GmbH, Dortmund (DE)

( * ) Notice: Subject to any disclaimer, the term of this patent is extended or adjusted under 35 U.S.C. 154(b) by 433 days.

(21) Appl. No.: 13/120,172

(22) PCT Filed: Sep. 11, 2009

(86) PCT No.: PCT/EP2009/006592
§ 371 (c)(1),
(2), (4) Date: Mar. 22, 2011

(87) PCT Pub. No.: WO2010/049033
PCT Pub. Date: May 6, 2010

(65) Prior Publication Data

US 2011/0168334 A1 Jul. 14, 2011

(30) Foreign Application Priority Data

Oct. 28, 2008 (DE) ......................... 10 2008 053 513

(51) Int. Cl.
*B65C 9/00* (2006.01)
*B32B 37/00* (2006.01)
*B32B 37/02* (2006.01)
*B65C 9/22* (2006.01)
*B65C 9/36* (2006.01)
*B65C 3/06* (2006.01)
*B65C 9/18* (2006.01)

(52) U.S. Cl.
CPC .................................... *B65C 9/1819* (2013.01)
USPC . 156/538; 269/21; 156/DIG. 9; 156/DIG. 11; 156/DIG. 37

(58) Field of Classification Search
CPC .......... B37B 37/00; B37B 37/02; B65C 3/06; B65C 3/065; B65C 9/00; B65C 9/22; B65C 9/36
USPC .............. 156/538, DIG. 9, DIG. 11, DIG. 37; 269/21
See application file for complete search history.

(56) References Cited

U.S. PATENT DOCUMENTS 4,758,300 A 7/1988 King et al.
5,885,406 A 3/1999 Tiefel
(Continued)

FOREIGN PATENT DOCUMENTS

DE 102006013844 10/2007
DE 202006008109 10/2007
(Continued)

OTHER PUBLICATIONS

Translation of DE 102006013844, Oct. 11, 2007.*
Translation of DE 202006008109, Oct. 4, 2007.*

* cited by examiner

*Primary Examiner* — George Koch
(74) *Attorney, Agent, or Firm* — Occhiuti & Rohlicek LLP

(57) ABSTRACT

The invention relates to a vacuum pad for use on vacuum drums (8) of labeling machines for labeling bottles or like containers (2) with labels (3), having a plurality of vacuum openings (10) provided at least on a partial area (21, 21*a*) of the vacuum pad (9, 9*a*) and formed by channels (37, 38) that can have a vacuum applied thereto in the at least one partial area (21, 21*a*), characterized in that the vacuum pad (9, 9*a*) is manufactured of a transparent material, such as a transparent plastic, at least in the partial area (21, 21*a*) comprising the vacuum openings and the channels (37, 38).

18 Claims, 7 Drawing Sheets

(56) References Cited

U.S. PATENT DOCUMENTS

Figure 1:
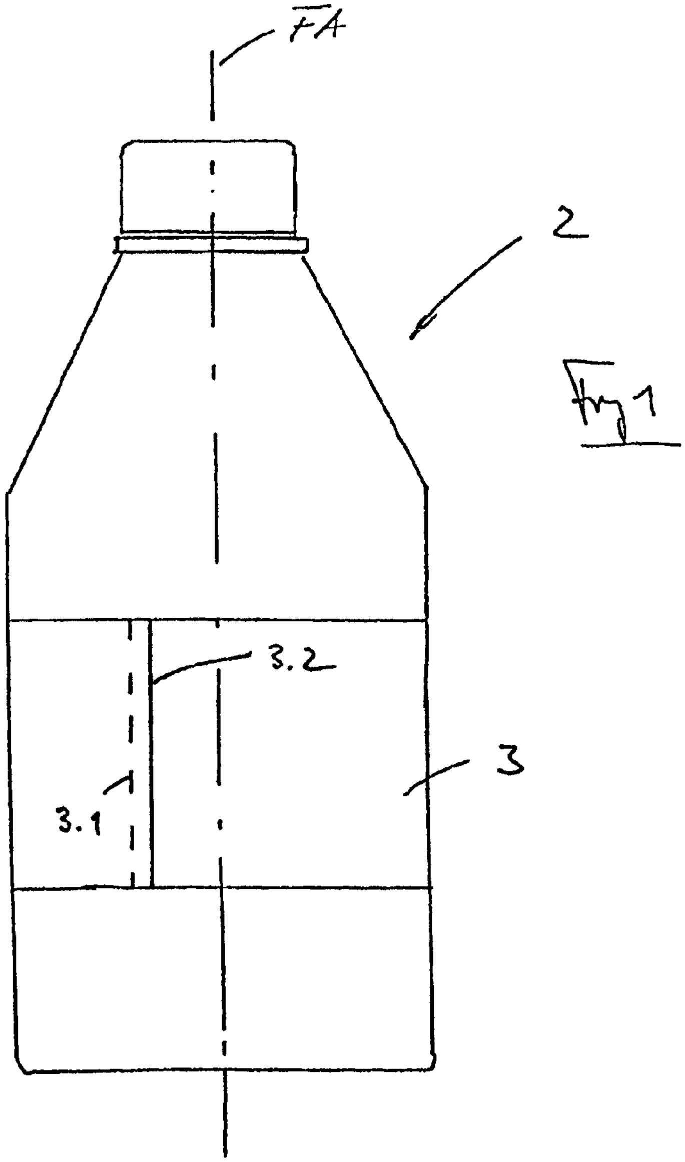

| | | | | |
|---|---|---|---|---|
| 7,891,397 | B2 | 2/2011 | Kramer et al. | |
| 2007/0226951 | A1 * | 10/2007 | Hawkins et al. | 15/347 |
| 2009/0205786 | A1 | 8/2009 | Hafner et al. | |

FOREIGN PATENT DOCUMENTS

| | | |
|---|---|---|
| JP | 2003-104338 | 4/2003 |
| WO | 2007/110199 | 10/2007 |

VACUUM PAD AND LABELING MACHINE

CROSS-REFERENCE TO RELATED APPLICATIONS

This application is the National Stage of International Application No. PCT/EP2009/006592, filed on Sep. 11, 2009, which claims the benefit of the priority date of German Patent Application No. 10 2008 053 513.3, filed on Oct. 28, 2008. The contents of both applications are hereby incorporated by reference in their entirety.

The invention relates to vacuum pads for use with vacuum drums of labelling units as per the generic term used both in Patent Claim 1 and on the labelling unit.

Labelling units for labelling of bottles or similar containers are known in various versions, in particular also those with at least one vacuum drum that can be driven around a drum axis, with which the movement of the labels within the respective labelling unit and/or the delivery of the labels to the containers that are moved past the labelling unit is achieved. Labelling units are in particular also known, with which the labels, for example the labels that are detached from a tape-like labelling material, are held on the vacuum drum and are moved so that they go past at least one gluing device or station for producing at least one glue-coating on the label.

Preferably exchangeable vacuum holders or vacuum pads are fitted here for holding the labels on the respective vacuum drums, which each have a large number of vacuum openings, which are connected to vacuum channels on the drum side via drillings or channels that are formed in the vacuum pad and which are on a strip-like section that is also preferably projecting over the remaining circumferential surface of the vacuum drum and is orientated in an axial direction that is parallel to—or for the most part parallel to—the drum axis.

Dust and dirt particles from the surrounding air as well as paste or glue particles that are sucked in by the vacuum and partial vacuum are drawn into the inside of the vacuum pads or the adjacent channels or connections, which have comparatively small flow cross-sections, for example in the range of from around 1.5 up to 3 mm and which can therefore become contaminated very quickly, with the result that the operation of the respective vacuum pad is at the least impaired. It is thereby particularly detrimental if the vacuum pads remain in operation for a lengthy period of time without breaking down in spite of the constantly increasing contamination, but then suddenly and unexpectedly fail completely and thereby result in undesirable stoppages of production occurring, which can only be rectified after a lengthy investigation into the cause of the breakdown.

The purpose of the invention is to demonstrate a vacuum pad, which enables the early detection of contamination and the avoidance in particular of the unforeseen production stoppages that are associated with this. A vacuum pad as per Patent Claim 1 has been designed to resolve this problem. A labelling unit with at least 2 vacuum pads of this type has been designed as per Patent Claim 10.

The vacuum pad as per the invention, at least in the section of the body of the pad in which the channels that form the vacuum openings are provided, is manufactured using a transparent material, for example a transparent plastic. By means of this, the contamination, particularly of the channels or drillings that form the vacuum openings, but also the contamination of vacuum openings that are behind these, can be detected easily and in good time and so that the operating staff can check the state of the channels within the vacuum pads by a visual inspection and thereby can recognize and/or remove possible contaminations in advance.

Further developments, advantages and possible applications of the invention are the result of the following description of examples of the design and of the illustrations. In these all of the characteristics that are described and/or shown in the form of illustrations on their own or in any combination are basically an object of the invention, regardless of their make-up in the claims or their retroactive application. Also the content of the claims will be made an integral part of the description.

Figure 2:
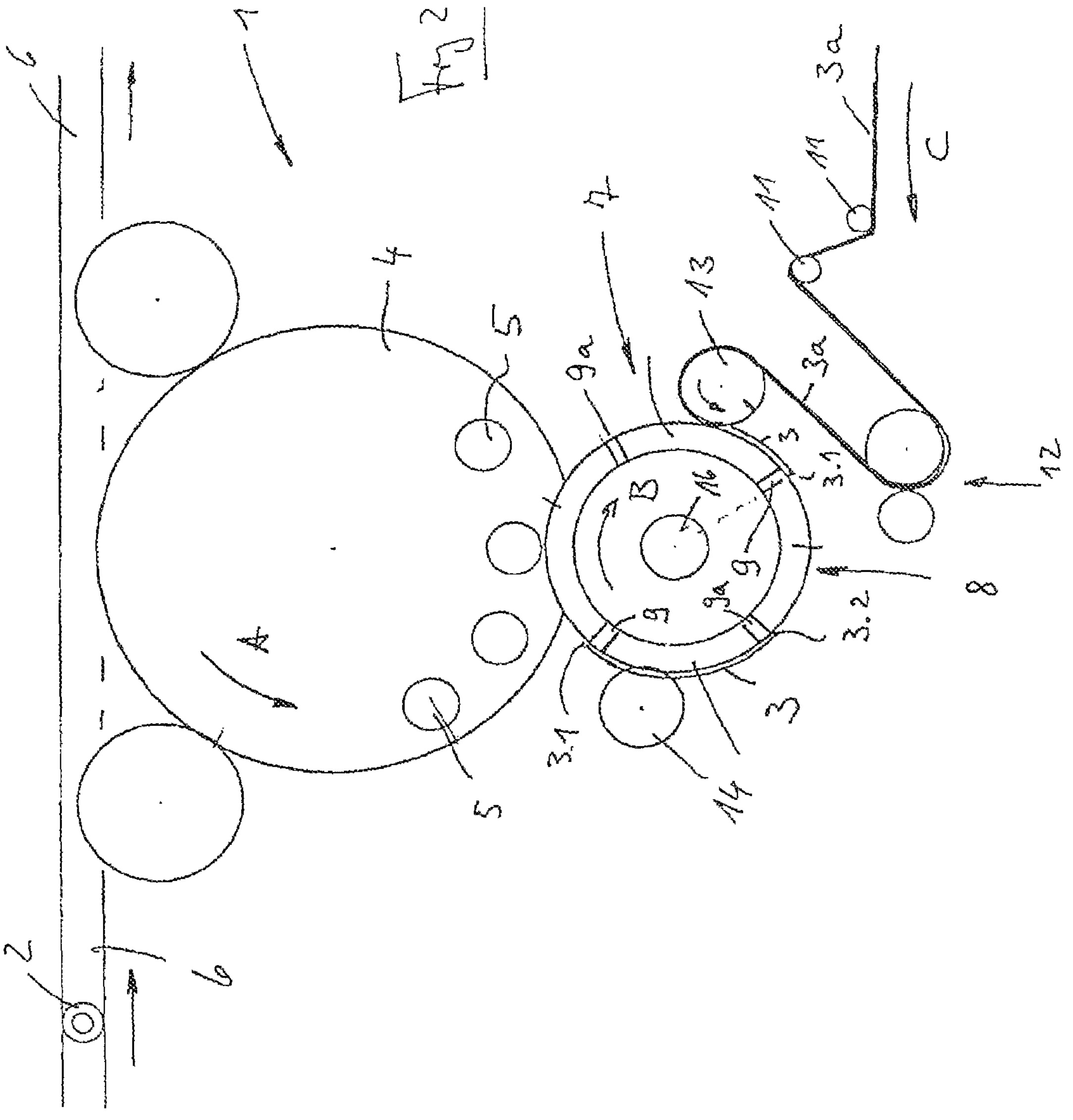
Figure 3:
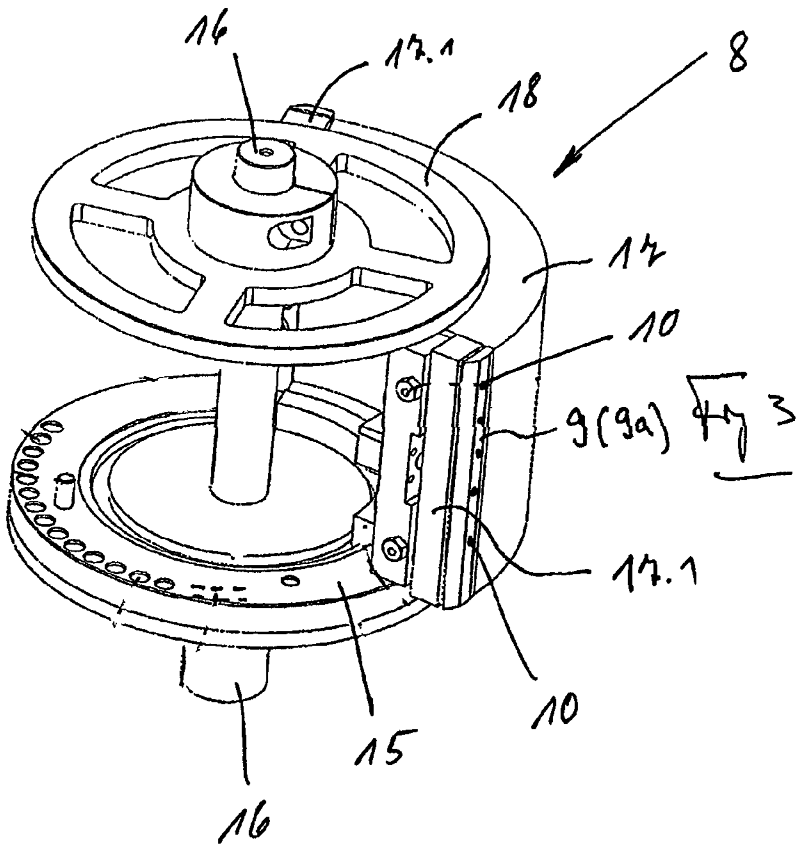
Figure 4:
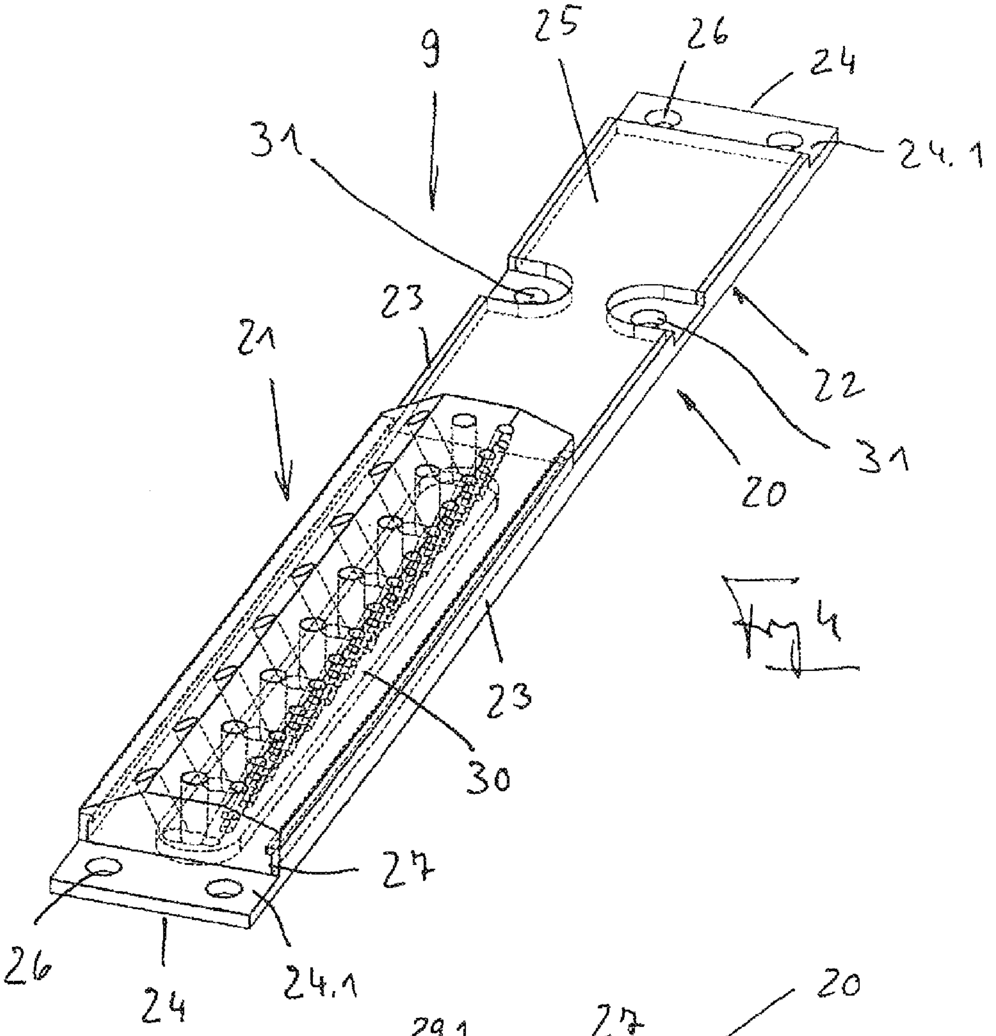
Figure 5:
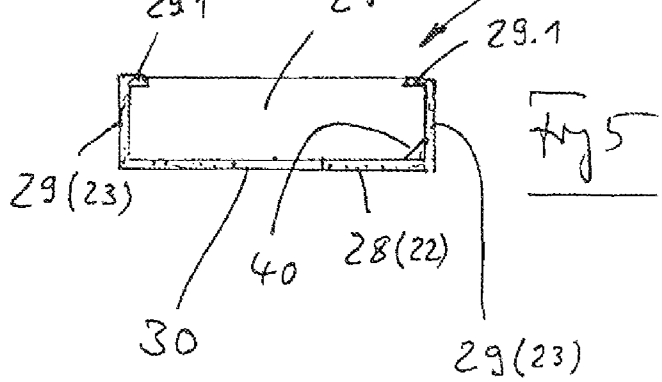
Figure 6:
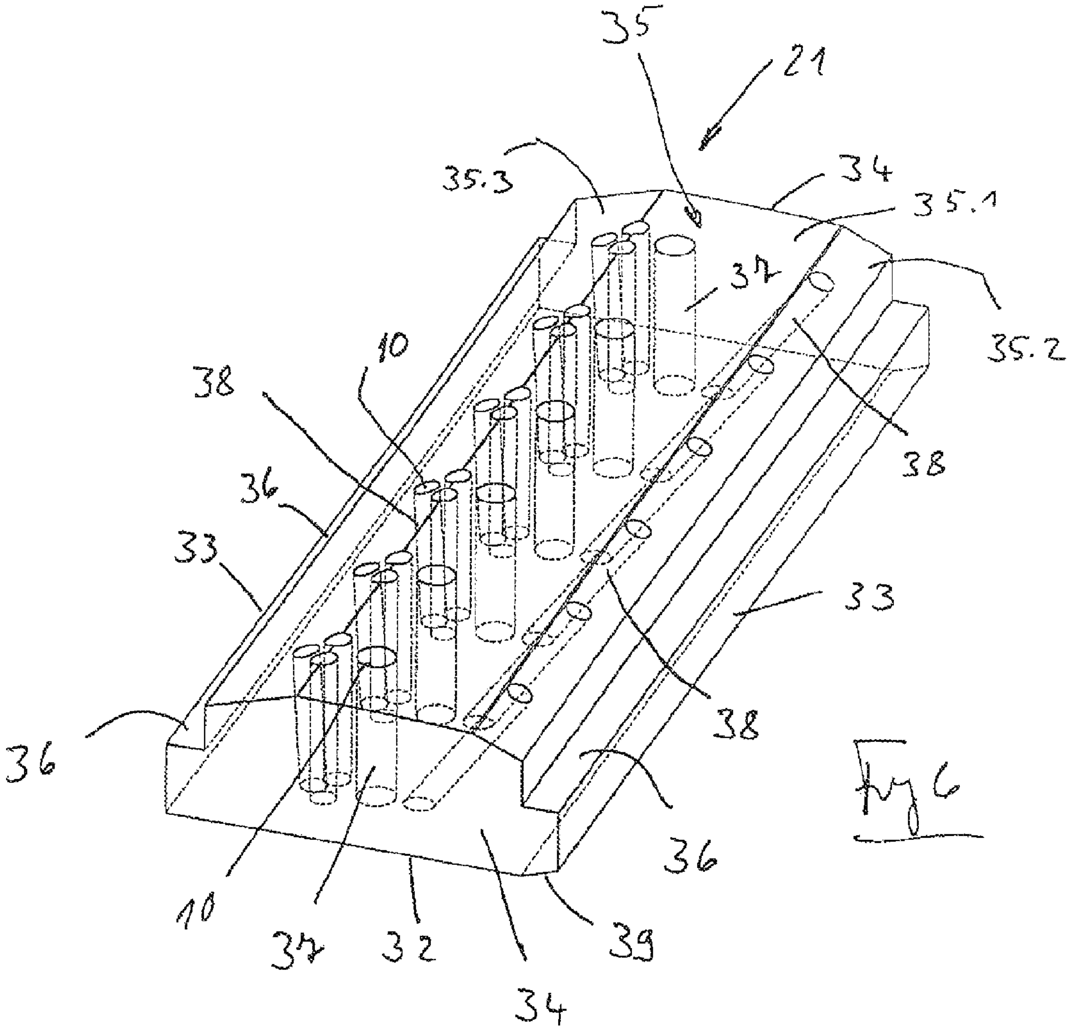
Figure 4:
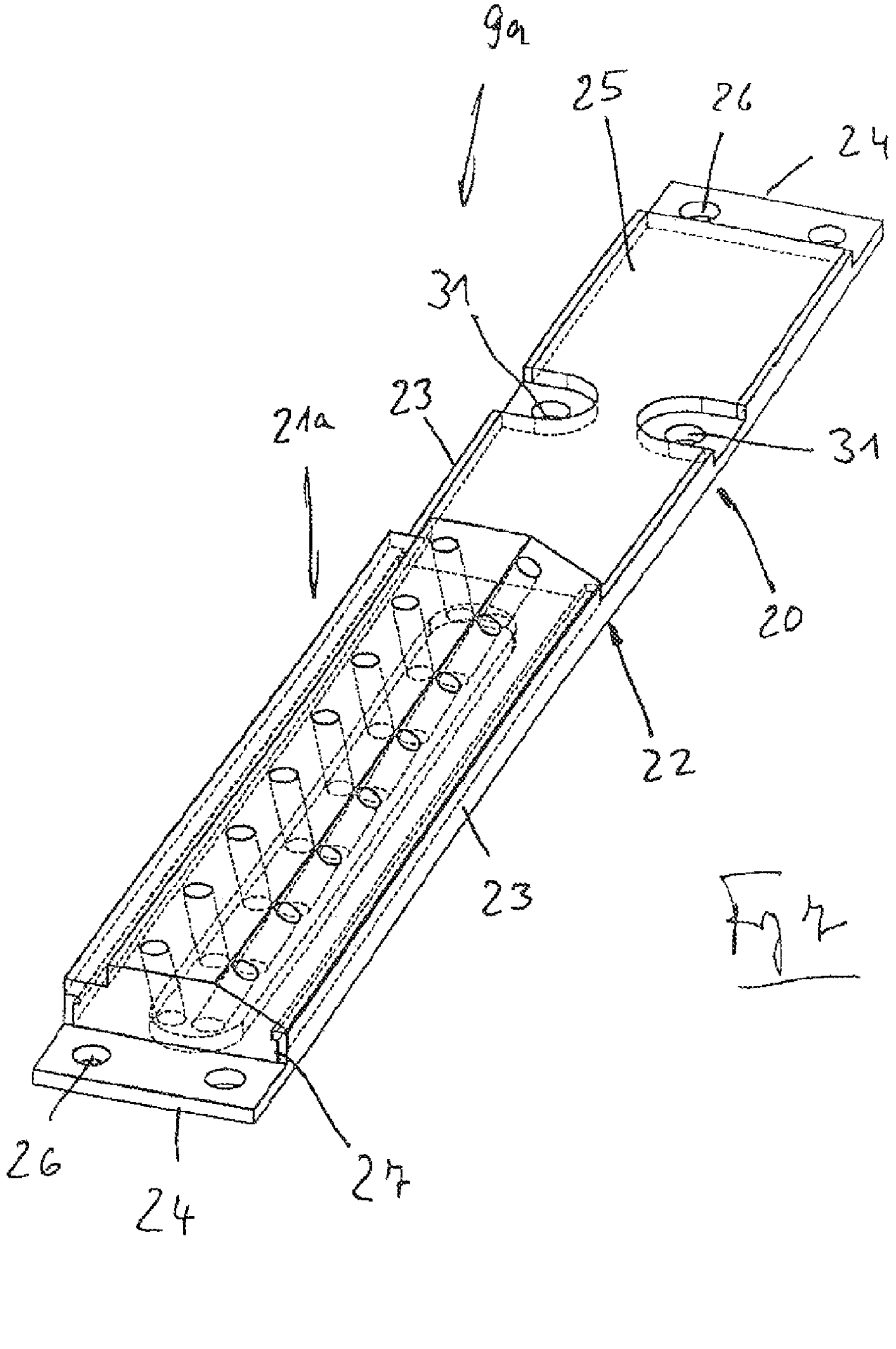
Figure 8:
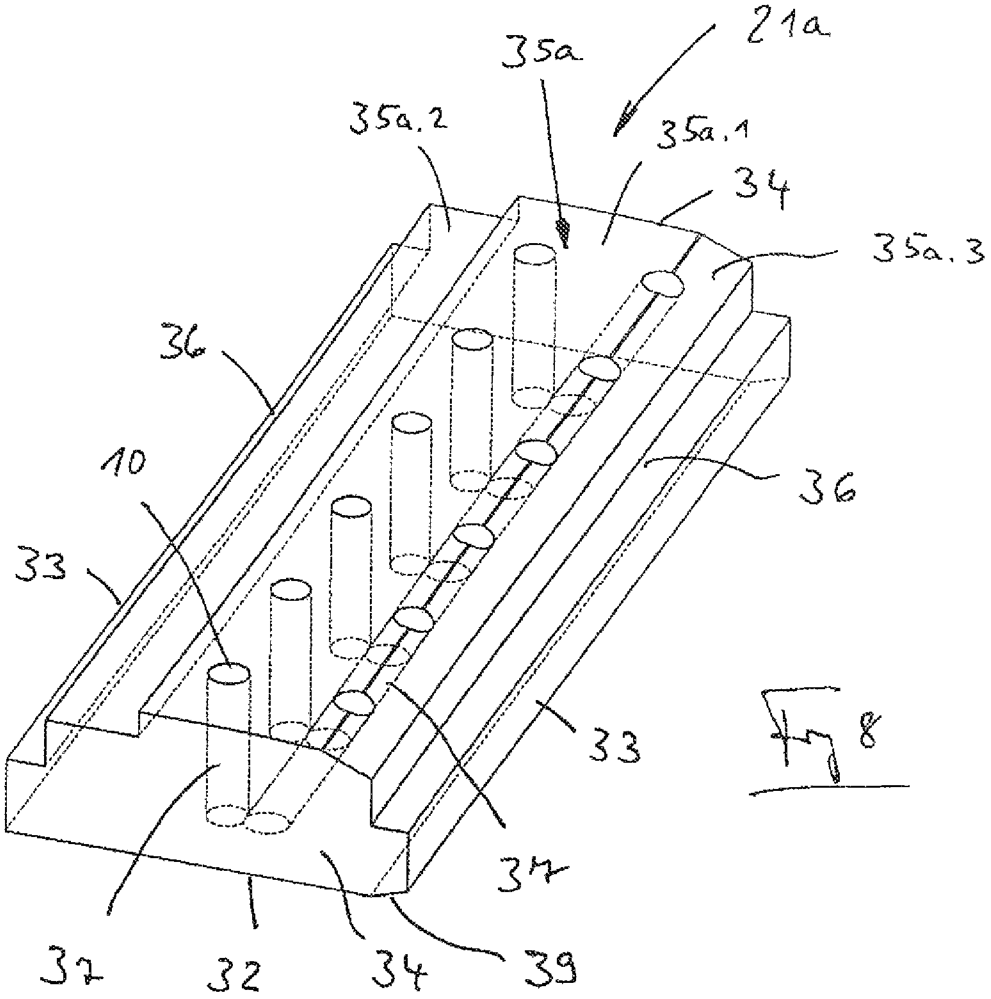

The invention is explained in more detail here below with the illustrations of examples of models. These include:

FIG. 1: a container in the form of a bottle with a wrap-around labelling device;

FIG. 2: a labelling unit of a labelling machine in a schematic illustration and in a top view;

FIG. 3: partial description in perspective of a vacuum drum of the labelling unit from FIG. 1;

FIG. 4: a vacuum pad in a single illustration in perspective as per the invention for use with the labelling unit from FIG. 2 or for use on the vacuum drum from FIGS. 2 and 3;

FIG. 5: a through-section of a supporting body of the vacuum pad from FIG. 4;

FIG. 6: a single illustration in perspective of the vacuum pad from FIG. 4;

FIGS. 7 and 8: illustrations as FIGS. 4 and 6 with a further model of the vacuum pump.

In the illustrations, FIG. 1 is a labelling machine designed as a rotating machine for labelling bottles with labels 3, for example with wrap-around labels. The labelling machine in the known manner for this consists of a rotor 4 that is driven in a rotating manner in the direction of the Arrow A around a vertical machine axis with large numbers of formed supporting bases provided on the circumference of the rotor 4 in the form of turntables 5 in each case to receive one bottle 2. The bottles for labelling 2 are guided to the rotor 4 via a conveyor 6 on a bottle in-feed, so that in each case one bottle 2 is arranged standing upright on a turntable 5, i.e. with the bottle axis FA pointing vertically upwards. The bottles, amongst other things, are circulated with the rotor 4 on a labelling unit 7, which has in each case on its rear side a gluing device and a label with a protruding labelling end 3.1 on the circumference of a vacuum drum 8, which is transferred to each conveyed bottle 6 and finally applied to the bottle 2 by wrapping or pressing whilst the bottle 2 rotates and the label 3 is stripped off from the vacuum drum 8. The labelled bottles 2 are further conveyed again on the conveyor 6 on a container or a bottle discharge on the conveyor 6 for removal.

Vacuum holders or vacuum pads 9 and 9*a* are provided with vacuum openings 10 for holding the labels onto the circular cylindrically shaped circumferential surface of the vacuum drum 8, which is driven around a vertical axis synchronously with the rotor 4, but in the opposite rotational direction, i.e. in the direction of the Arrow B and in fact in each case there is a vacuum pad 9 for holding the respective label 3 on its protruding end 3.1 in the rotating direction of the vacuum drum 8 and a vacuum pad 9*a* for holding each label on the successively guided end of the label 3.2 that is in relation to the rotating direction of the vacuum drum 8. The vacuum pads 9 and 9*a* are fitted in pairs and in fact in an angled separation, which is the same as the length of a label.3.

The labels 3 in the version of the design that is illustrated are produced from a labelling material 3*a* that is in strips and which is detached in the direction of the Arrow by being cut-off or separated from a supply point (supply spool), which is not illustrated. The labelling material 3*a* is guided for this to the labelling unit 7 via several rollers 11 and a motor-driven detaching device 12 and arrives at a cutting roller 13, on which the respective length forming the respective label 3 is separated from the labelling material 3*a* and is transferred to the vacuum drum. Each label 3 held on the vacuum drum with the vacuum pads 9 and 9*a* is moved past onto a gluing station 14 for providing an application of glue on the protruding ends 3.1 and 3.1. In order to ensure that the glue application is only applied on the protruding ends 3.1 and 3.2 of each label 3, the strip-like vacuum pads 9 and 10 are positioned with their lengthways side oriented parallel to the rotating axis of the vacuum drum and projected somewhat above the remaining circular cylindrically-shaped circumferential surface of the vacuum drum 8.

The vacuum drum in the version of the model that is illustrated is of a multi-piece design, i.e. it is composed of a lower plate-type or circular disc-type support 15, which is on a vertical shaft 16 that drives the vacuum drum 8, which consists of several segments 17 forming the circumferential surface of the vacuum drum 8 and of nozzle bodies 17.1 arranged in the form of strips between the segments 17 and which are oriented with their lengthways side parallel to the axis of the vacuum drum 8, and of a circular disc-shaped cover 18 that is fixed to the shaft 16 in such a way that the segments 17 and the nozzle bodies 17.1 are held clamped between the plate-shaped support 15 and the cover 18.

The nozzle bodies 17.1, which are for example also produced as one-piece with in each case one segment 17 are designed in each case with at least one vacuum distribution channel, which is connected, via a revolving joint that is not illustrated, to an external vacuum source and has a vacuum-connecting opening 19 on the outer side of the vacuum drum 8 or of the drum-body that forms this drum, which extends over a greater part of the axial length of the nozzle body 17.1. A vacuum pad 9 or 9*a* is fixed to each nozzle body 17.1 and is in fact of a type so that the vacuum openings 10 that are provided on the respective vacuum pad are connected to the vacuum channel of the relative nozzle body 17.1, via the vacuum connection opening 19.

FIG. 4 shows the vacuum pad 9 in a perspective illustration, which is designed as two pieces in the version of the design that is shown and in fact consists of a supporting body 20 that is a strip-type or shaped for the most part as a flat, rectangular plate and of an exchangeable insert 21 that is fixed to the supporting body 20, which holds the vacuum openings of the vacuum pad. The supporting body 20 is for example produced as a plastic moulded part and also with a flat base to the supporting body 22, with two narrow sides of the supporting body 23 that are parallel and separated from each other and with two narrow sides of the supporting body 24. The supporting body 20 on both narrow sides of the supporting body 24 has drillings 26 for fixing the vacuum pad 9 on the outer surface of the respective nozzle body 17.1 on its supporting body top side 25 over the whole width in each case with a gradation 24.1 or 25.1.

Based on a gradation 24.1, a recess 27 is formed on the supporting body top side 25 for fastening the insert 21. The recess 27 extends in the lengthways direction of the supporting body over a large part of the length of this supporting body, i.e. in the version of the design that is illustrated more or less half of the length of the supporting body 20. The recess 27 has a C-shaped cross-section, which is formed by a base 28 and two wall sections 29 that protrude in each case part of the length of a lengthways side 23 over the base 28, which each have an angled portion 29.1 at their free edge that reaches into the recess 27 for the positive locking of the insert 21. The base 28 has an aperture 30 in its middle, which extends in the lengthways direction of the supporting body over the greater part of the recess 27.

Two further drillings 31 for fastening screws to fix the vacuum pad 9 onto the outer surface of the nozzle body 17.1 are provided outside of the recess 27 on the two lengthways sides 23 in the area of the edge-side indentations. The aperture 30 is located in the assembled condition congruent with a part of the vacuum connection opening 19. The remaining part of the vacuum connection opening 19 is covered or sealed by the supporting body 20.

The insert 21 is made from a transparent plastic, for example from PVC, i.e. soft PVC and in fact with a flat or for the most part flat base/underside 32 with two lengthways sides 33 and two end faces 34. The cross-section profile that remains constant over the whole length of the insert 21 is composed of a greater width section which forms the base/underside 32 which is for the most part rectangular in profile, of a reduced width section that is also rectangular in profile and of a top section that is trapezoidal in profile. The latter forms the top side 35 of the insert 21 with the surface sections 35.1-35.3 of which the central surface section 35.1 runs parallel to the underside 32 and the side sections 35.2 and 35.3 are sloping in compared to 35.1, With the insert 21 fastened onto the supporting body 20, the wider profile section that forms the underside 32 is conveniently accommodated in the recess 27 and the formed gradations 36 on the lengthways sides 33 are gripped behind in a positive locking in each case by an angled portion 29.1. The insert 21 protrudes over the top side supporting body 25 with its remaining part.

Drillings or channels 37 with a greater cross-section and drillings or channels 38 with a smaller cross-section are provided for the forming of the vacuum openings 10 and this is done in such a way that all of the channels 37 and 38 with one end on the lower side 32 discharge into a central area that is located there. The channels 37 mainly on the top side 35 are open on the surface area 35.1 and form the vacuum openings 10 there, whilst the channels 38 on the surface areas 35.2 and 35.3 and also on the intersection between the surface areas 35.1 and 35.3 are open and form the vacuum openings 10 there (FIG. 6).

When the vacuum pad 9 is installed all of the channels 37 and 38 are connected to the vacuum channel of the nozzle body 17.1 in question via the aperture 30 and the vacuum connection opening 19. The vacuum pad 9 is mounted in such a way that the vacuum, openings 10 that are formed by the channels 38 on the surface area 35.3 are each located on the side of the vacuum pad 9 that holds the protruding label end 3.1. In spite of the exchangeability of the inserts 21 in order to install these inserts 21 in the correct position, the insert 21 is encoded in fact by means of a chamfer 39 on one lengthways side 33. An encoding corresponding to this coding or chamfer 40 is also provided in the area of the recess 27, so that the insertion of the respective insert 21 is only possible in this recess 27 if it is correctly aligned.

Thanks to the production of the respective insert 21 using a transparent material 30, it is possible to visually check the overall operational efficiency of this insert and with that of the vacuum pad 9 and to detect at an early stage any possible contamination having a detrimental affect on the operational efficiency, particularly that of the channels 37 and 38 forming the vacuum openings 10 and contamination of the aperture 30 and of the vacuum opening 19 that is positioned behind this or of the vacuum channel formed from the nozzle body 17.1. FIG. 7 shows the vacuum pad 9*a* in a perspective illustration, which consists on the other hand of the supporting body 20 and of an insert 21*a*, which is retained positively-locked in the recess 27 of the supporting body 20 and only differs directly from the insert 21 by having an different cross-section and in fact in the shape so that the top side 35*a* of the three surface areas 35*a*.1-35*a*. 3 is formed, from which the surface areas 35*a*.1 and 35*a*.2 extend parallel to the base 32 and the surface 35*a*.3 forms a chamfer.

On the other hand, there are several channels provided in insert 21*a* that form the vacuum opening 10 and in fact exclusively the channels 37 with the larger cross-section, which discharge on the top side 35*a*, on the surface area 35*a*.1 and on the intersection between the surface areas 35*a*.1 and 35*a*.3 and on the base 32 in the central area and in fact in such a way that when the vacuum pad 9*a* is installed, all of the channels 37 are connected to the vacuum channel of the nozzle body 17.1 via the aperture 30 and the vacuum, connection opening 19.

The insert 21*a* is also manufactured from transparent plastic and has on the other hand the chamfer 39 that interacts with the chamfer 40 that is there for the correct installation on the supporting body 20.

The lengths of the inserts 21 or 21*a* correspond to the width of the labels 3 that are to be processed. Using the vacuum pads 9 and 9*a* with inserts 21 or 21*a*, adjustments for shorter or longer lengths can be made on the labelling unit 7 to labels 3 that are of lesser or greater width. The supporting body 20 is then adjusted in line with the length of its recess 27 and with the length of the aperture 30 to the length of the insert 21 or 21*a* and in fact to the same length and width as that of the supporting body 20.

The invention has been described here-above by means of examples of the design. It should be understood that numerous changes and variations are possible without straying from the basic thinking behind the invention. Thus it has been assumed above that the supporting body 20 is manufactured as a plastic moulding. The possibility obviously also exists of manufacturing the supporting body in question 20 using a metallic material.

Furthermore, it has been assumed above that the respective insert 21 or 21*a* is fitted so that it can be exchanged on the supporting body 20. Basically, the possibility also exists of producing the supporting body 20 with the related insert 21 or 21*a* as an exchangeable moulding, for example by means of injection moulding of the insert 21 or 21*a* on the supporting body 20 from metal or plastic and/or in a two-component injection moulding process using a harder plastic for the supporting body 20 and a softer and transparent plastic for the respective insert 21 or 21*a*.

LIST OF REFERENCES

1 Labelling machine
2 Bottle
3 Label
3.1 Protruding label end
3.2 Successively guided label end
4 Rotor
5 Turntable
6 Conveyor
7 Labelling unit
8 Vacuum drum
9, 9*a* Vacuum holder or vacuum pad
10 Vacuum opening
11 Roller
12 Detaching device
13 Cutting roller
14 Gluing station
15 Support
16 Shaft of vacuum drum 8
17 Vacuum drum segment
17.1 Nozzle body
18 Circular disc-shaped cover
19 Vacuum connection opening in the nozzle body 17.1
20 Supporting body
21,21*a* Insert
22 Supporting body base
23 Lengthways side of supporting body
24 Narrow side of supporting body
24.1 Gradation
25 Top side of supporting body
26 Drilling
27 Recess
28 Base of the recess 27
29 Wall sections
29.1 Angled portion
30 Aperture in the base 28
31 Drillings
32 Base of the insert 21, 21*a*
33 Lengthways sides
34 Narrow sides
35,35*a* Top side of the insert 21 or 21*a*
35.1-35.3 Surface area
35*a*.1-35*a*.3 Surface area
36 Gradation
37, 38 Channel
39 Chamfer
40 Chamfer surface

The invention claimed is:

1. A manufacture comprising a vacuum pad for use on vacuum drums of labeling units for labeling containers with labels by actuating, with a vacuum, a large number of vacuum openings formed by channels in at least one section thereof, the vacuum pad, at least in the section having the vacuum openings and the channels, being manufactured from a transparent material, said vacuum pad being configured to pass a label through a gluing station for application of glue only to protruding ends of said label.

2. The manufacture of claim 1, wherein the transparent material comprises a transparent elastic plastic.

3. The manufacture of claim 1, wherein the vacuum pad comprises: an exchangeable supporting body that can be attached to a vacuum drum of a labeling unit; and at least one insert manufactured from the transparent material and being provided on the supporting body, the insert having channels that form the openings.

4. The manufacture of claim 3, wherein the supporting body forms a base supporting body for attaching to a vacuum drum, and wherein at least one insert, with the section that has the vacuum openings, projects over a top side of the supporting body that is on a side away from the base of the supporting body.

5. The manufacture of claim 3, wherein the supporting body comprises a plate.

6. The manufacture of claim 3, wherein the supporting body comprises walls defining a recess for the positive-locking accommodation of the section that has the vacuum openings and the channels.

7. The manufacture of claim 6, wherein the walls defining the recess comprise a base defining an aperture for connecting to a vacuum connection opening of a vacuum drum, and wherein the channels that form the vacuum openings end at the aperture.

8. The manufacture of claim 7, wherein the aperture extends in a direction of a vacuum extending aperture.

9. The manufacture of claim 3, wherein the supporting body comprises a rectangular plate extending in a lengthwise direction of the supporting body.

10. The manufacture of claim 3, wherein the supporting body comprises walls defining a recess for the positive-locking accommodation of an insert that forms the section having vacuum openings and channels.

11. The manufacture of claim 1, wherein the vacuum openings are provided on a top side of the vacuum pad, the top side extending in a lengthwise direction of the vacuum pad.

12. The manufacture of claim 1, wherein the vacuum pad comprises a convex-shaped topside that has the vacuum openings.

13. The manufacture of claim 1, wherein the transparent material comprises transparent plastic.

14. The manufacture of claim 1, wherein the transparent material comprises PVC.

15. The manufacture of claim 1, wherein the vacuum openings are provided on a surface area that extends in a lengthwise direction of the vacuum pad.

16. The manufacture of claim 1, wherein the vacuum pad comprises at least two surface areas that jointly include an angled portion.

17. An apparatus for use in a labeling machine for the labeling of containers using a vacuum drum that rotates around a drum axis, said apparatus comprising at least two vacuum pads that are offset around the drum axis for holding the labels, each vacuum pad having vacuum channels, each of which ends in a vacuum opening, each of said vacuum pads being transparent, and a gluing station for applying glue to the labels as the labels are held on the vacuum drum.

18. The apparatus of claim 17, wherein the vacuum pad is installed with a lengthwise axis thereof being parallel to the drum axis on the vacuum drum along an area having a vacuum connection.

* * * * *